United States Patent
Kim et al.

(10) Patent No.: US 9,037,176 B2
(45) Date of Patent: May 19, 2015

(54) METHOD AND APPARATUS FOR ALLOCATING DEVICE IDENTIFIERS (STID) IN A WIRELESS ACCESS SYSTEM

(75) Inventors: Jeongki Kim, Anyang-si (KR); Youngsoo Yuk, Anyang-si (KR); Giwon Park, Anyang-si (KR); Kiseon Ryu, Anyang-si (KR); Jin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 13/643,773

(22) PCT Filed: Apr. 29, 2011

(86) PCT No.: PCT/KR2011/003234
§ 371 (c)(1),
(2), (4) Date: Oct. 26, 2012

(87) PCT Pub. No.: WO2011/136620
PCT Pub. Date: Nov. 3, 2011

(65) Prior Publication Data
US 2013/0040680 A1    Feb. 14, 2013

Related U.S. Application Data

(60) Provisional application No. 61/329,534, filed on Apr. 29, 2010.

(51) Int. Cl.
*H04B 7/00* (2006.01)
*H04W 8/18* (2009.01)
(Continued)

(52) U.S. Cl.
CPC .............. *H04W 8/186* (2013.01); *H04W 4/005* (2013.01); *H04W 4/08* (2013.01); *H04W 88/08* (2013.01); *H04W 92/18* (2013.01); *H04L 61/2069* (2013.01); *H04W 8/26* (2013.01)

(58) Field of Classification Search
CPC ....................................... H04W 8/186
USPC ................... 455/509, 419, 434, 572
See application file for complete search history.

(56) References Cited

U.S. PATENT DOCUMENTS 7,889,755 B2 * 2/2011 Malladi et al. ................ 370/432
2005/0177620 A1 8/2005 Lee et al.
(Continued)

FOREIGN PATENT DOCUMENTS

CN      101299674 A      11/2008
JP      2008-244559 A    10/2008
(Continued)

OTHER PUBLICATIONS

Huawei, "MTC group subscription," 3GPP TSG SA WG2 Meeting #78, Feb. 22-26, 2010, pp. 1-5, TD S2-101083.
(Continued)

*Primary Examiner* — Sanh Phu
(74) *Attorney, Agent, or Firm* — Birch, Stewart, Kolasch & Birch, LLP

(57) ABSTRACT

The present description provides a method for allocating a device identifier through an initial network entry process with a base station in a wireless access system. The method comprises a step of transmitting control information, indicating a mobile station supporting Machine to Machine (M2M) communication, to a base station; and receiving a first message, comprising at least one of a first identifier indicative of a group to which devices belong and a second identifier indicative of each of the devices belonging to the group, from the base station.

6 Claims, 8 Drawing Sheets

(51) Int. Cl.
*H04W 4/00* (2009.01)
*H04L 29/12* (2006.01)
*H04W 8/26* (2009.01)
*H04W 4/08* (2009.01)
*H04W 88/08* (2009.01)
*H04W 92/18* (2009.01)

(56) References Cited

U.S. PATENT DOCUMENTS

| | | |
|---|---|---|
| 2007/0082621 A1 | 4/2007 | Lee et al. |
| 2007/0206561 A1 | 9/2007 | Son et al. |
| 2008/0153521 A1 | 6/2008 | Benaouda et al. |
| 2009/0191857 A1 | 7/2009 | Horn et al. |
| 2009/0217348 A1 | 8/2009 | Salmela et al. |
| 2009/0232060 A1 | 9/2009 | Loa et al. |
| 2010/0008327 A1 | 1/2010 | Son et al. |
| 2010/0057485 A1 | 3/2010 | Luft |

FOREIGN PATENT DOCUMENTS

| | | |
|---|---|---|
| KR | 1020030088097 A | 11/2003 |
| KR | 10-2007-0080735 A | 8/2007 |
| RU | 2 387 081 C2 | 4/2010 |
| WO | WO 2009/095295 A1 | 8/2009 |

OTHER PUBLICATIONS

LG Electronics Inc., "RAN consideration on Machine Type Communication," 3GPP TSG-RAN2 Meeting #68bis, Jan. 18-22, 2010, pp. 1-2, R2-100093.

\* cited by examiner

METHOD AND APPARATUS FOR ALLOCATING DEVICE IDENTIFIERS (STID) IN A WIRELESS ACCESS SYSTEM

This application is the National Phase of PCT/KR2011/003234 filed on Apr. 29, 2011, which claims priority under 35 U.S.C. 119(e) to the U.S. Provisional Application No. 61/329,534 filed on Apr. 29, 2010, all of which are hereby expressly incorporated by reference into the application.

TECHNICAL FIELD

This specification relates to a wireless access system and, more specifically, to a method and apparatus for allocating a device identifier (ID) to a Machine-to-Machine (M2M) device in a system supporting M2M communication.

BACKGROUND ART

In order to allocate downlink or uplink resources to M2M devices, a base station has to know that a corresponding device has what type. In an M2M system, a lot of (about several hundreds of times to several thousands of times) devices may exist in a cell as compared with the existing system (802.16e or 802.16m).

If a lot of devices exist within a cell as described above, an addressing method (an STID of 12 bits) used in the existing system may not accommodate a lot of devices.

DISCLOSURE

Technical Problem

This specification is to provide a method for allocating M2M group IDs and M2M device IDs through an initial network entry and a method for managing allocated groups or device IDs, in a system supporting M2M communication.

Technical Solution

The present description provides a method for allocating a device identifier through an initial network entry process with a base station in a wireless access system. The method comprises a step of transmitting control information, indicating a mobile station supporting Machine to Machine (M2M) communication, to a base station; and receiving a first message, comprising at least one of a first identifier indicative of a group to which devices belong and a second identifier indicative of each of the devices belonging to the group, from the base station.

Furthermore, the mobile station may be an M2M device supporting M2M communication.

Furthermore, the first identifier may be an M2M group identifier, and the second identifier is an M2M device identifier.

Furthermore, the control information may be transmitted to the base station through an initial ranging procedure with the base station.

Furthermore, the control information may be an initial ranging code, and the method may further comprise the steps of: receiving a second message, comprising an initial ranging code set allocated to an M2M device, from the base station; and transmitting any one of the received initial ranging code sets to the base station.

Furthermore, the control information may be an initial ranging code, and the method may further comprises the steps of: receiving initial ranging region information allocated to an M2M device, from the base station; and transmitting the initial ranging code to the base station through the received initial ranging region.

Furthermore, the second message may be a Super Frame Header (SFH).

Furthermore, the control information may be transmitted to the base station through a basic capability negotiation process with the base station.

Furthermore, the control information may be transmitted to the base station through a registration procedure with the base station.

Furthermore, the first message may be a registration response (REG-RSP) message.

Furthermore, the first message may be a map information element (A-MAP IE), and the first identifier may be allocated through Cyclic Redundancy Check (CRC) masking.

Furthermore, the CRC masking may comprise a masking prefix, a message type indicator, and a masking code.

Furthermore, some or all of the masking codes may be allocated to the first identifier based on at least one value of the masking prefix and the message type indicator.

Furthermore, the first message may further comprise information on a number of groups to which the mobile station belongs and information on a number of mobile stations belonging to each of the groups.

Furthermore, a length of the second identifier may be a largest natural number value from among values each smaller than a value of log 2 (a total number of mobile stations that can be accommodated in each group).

Furthermore, the first message may be an M2M unicast allocating map information element (M2M unicast allocation A-MAP IE).

Furthermore, The present description provides a mobile station for allocating a device identifier through an initial network entry process with a base station in a wireless access system. The mobile station comprises a radio-frequency (RF) unit for transmitting and receiving radio signals with an outside; and a control unit connected to the wireless communication unit. The control unit controls the wireless communication unit so that the wireless communication unit sends control information, indicating a mobile station supporting Machine to Machine (M2M) communication, to the base station and receives a first message, comprising at least one of a first identifier indicative of a group to which devices belong and a second identifier indicative of each of the devices belonging to the group, from the base station.

Furthermore, the first identifier may be an M2M group identifier, and the second identifier may be an M2M device identifier. Furthermore, the control information may be transmitted to the base station through an initial ranging procedure with the base station.

Advantageous Effects

This specification is advantageous in that it can efficiently allocate STIDs to a lot of M2M devices within a cell by providing a method for allocating M2M group IDs and M2M device IDs through an initial network entry in a system supporting M2M communication.

MODE FOR INVENTION

The following technology may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be embodied using radio technology, such as Universal Terrestrial Radio Access (UTRA) or CDMA2000. TDMA may be embodied using radio technology, such as Global System for Mobile communications (GSM)/General Packet Radio Service (GPRS)/Enhanced Data Rates for GSM Evolution (EDGE). OFDMA may be embodied using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m, which is an evolved version of IEEE 802.16e, provides backward compatibility to systems based on IEEE 802.16e.

The UTRA is part of a Universal Mobile Telecommunications System (UMTS). 3$^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advance (LTE-A) is an evolved version of 3GPP LTE.

In order to clarify a description, IEEE 802.16m is chiefly described, but the technical spirit of the present invention is not limited thereto.

Figure 1:
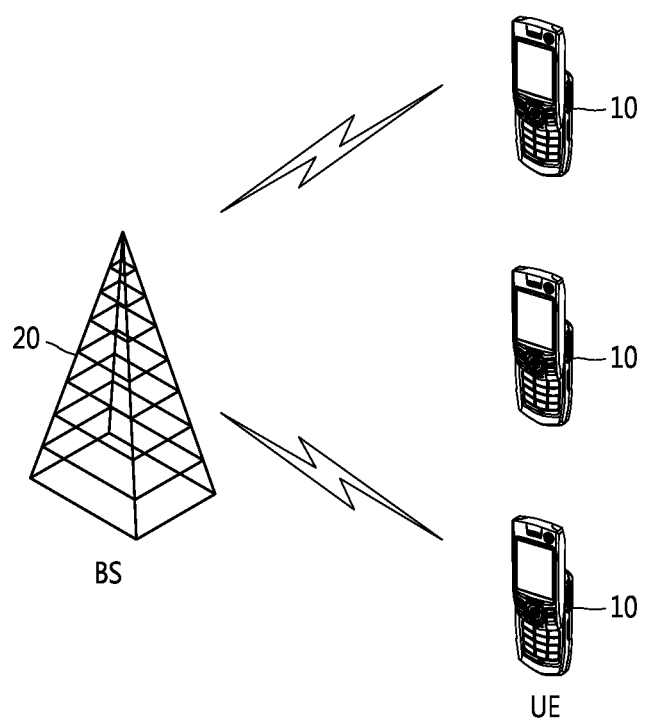
FIG. 1 is a block diagram illustrating a wireless communication system.

FIG. 1 is a block diagram illustrating a wireless communication system.

The wireless communication systems are widely deployed in order to provide a variety of communication services, such as voice and packet data.

Referring to FIG. 1, the wireless communication system includes Mobile stations (MSs) 10 and a Base Station (BS) 20. The MS 10 may be fixed or mobile and may also be called another terminology, such as User Equipment (UE), a User Terminal (UT), a Subscriber Station (SS), a wireless device, or an Advanced Mobile Station (AMS).

The BS 20 generally refers to a fixed station that communicates with the MSs 10, and it may also be called another terminology, such as a NodeB, a Base Transceiver System (BTS), or an access point. One or more cells may exist in one BS 20.

The wireless communication system may be a system based on Orthogonal Frequency Division Multiplexing (OFDM)/Orthogonal Frequency Division Multiple Access (OFDMA).

OFDM uses a plurality of orthogonal subcarriers. OFDM uses an orthogonal characteristic between Inverse Fast Fourier Transform (IFFT) and Fast Fourier Transform (FFT). A transmitter performs IFFT on data and sends the data. A receiver restores original data by performing FFT on a reception signal. A transmitter uses IFFT in order to combine multiple subcarriers, and a receiver uses corresponding FFT in order to separate multiple subcarriers.

Furthermore, a slot is a minimum data allocation unit and is defined by the time and subchannel. In uplink, a subchannel may be constructed of a plurality of tiles. A subchannel is constructed of 6 tiles. In uplink, one burst may be constructed of 3 OFDM symbols and 1 subchannel.

In Partial Usage of Subchannels (PUSC) permutation, each tile may include 4 contiguous subcarriers on 3 OFDM symbols. Alternatively, each tile may include 3 contiguous subcarriers on 3 OFDM symbols. A bin includes 9 contiguous subcarriers on an OFDM symbol. A band refers to a group of 4 rows of a bin, and an Adaptive Modulation and Coding (AMC) subchannel is constructed of 6 contiguous bins in the same band.

Figure 2:
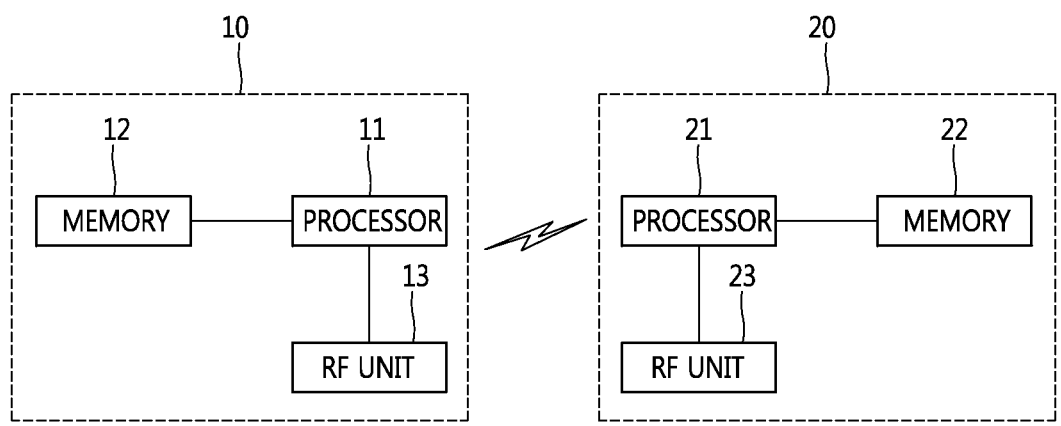
FIG. 2 shows an internal block diagram of an MS and a BS in a wireless access system.

FIG. 2 shows an internal block diagram of an MS and a BS in a wireless access system.

The MS 10 includes a control unit 11, memory 12, and a radio-frequency (RF) unit 13.

The MS further includes a display unit, a user interface unit, etc.

The control unit 11 embodies proposed functions, processes and/or methods. The layer of a wireless interface protocol may be embodied by the control unit 11.

The memory 12 is connected to the control unit 11, and it stores protocols or parameters for performing wireless communication. That is, the memory 12 stores an MS driving system, applications, and common files.

The RF unit 13 is connected to the control unit 11, and it transmits and/or receives radio signals.

Additionally, the display unit displays various pieces of information of the MS, and well-known elements, such as a Liquid Crystal Display (LCD) or Organic Light Emitting Diodes (OLED), may be used as the display unit. The user interface unit may be formed of a combination of well-known user interfaces, such as a keypad or a touch screen.

The BS 20 includes a control unit 21, memory 22, and an RF unit 23.

The control unit 21 embodies proposed functions, processes and/or methods.

The layers of a wireless interface protocol may be embodied by the control unit 21.

The memory 22 is connected to the control unit 21, and it stores protocols or parameters for performing wireless communication.

The RF unit 23 is connected to the control unit 21, and it transmits and/receives radio signals.

The control unit 11, 21 may include Application-Specific Integrated Circuits (ASICs), other chipsets, logic circuits and/or data processors. The memory 12, 22 may include Read-Only Memory (ROM), Random Access Memory (RAM), flash memory, memory cards, storage media and/or other storage devices. The RF unit 13, 23 may include a baseband circuit for processing a radio signal. When an embodiment is embodied in software, the above-described scheme may be embodied using a module (process, function, etc.) that performs the above function. The module may be stored in the memory 12, 22 and executed by the control unit 11, 21.

Figure 3:
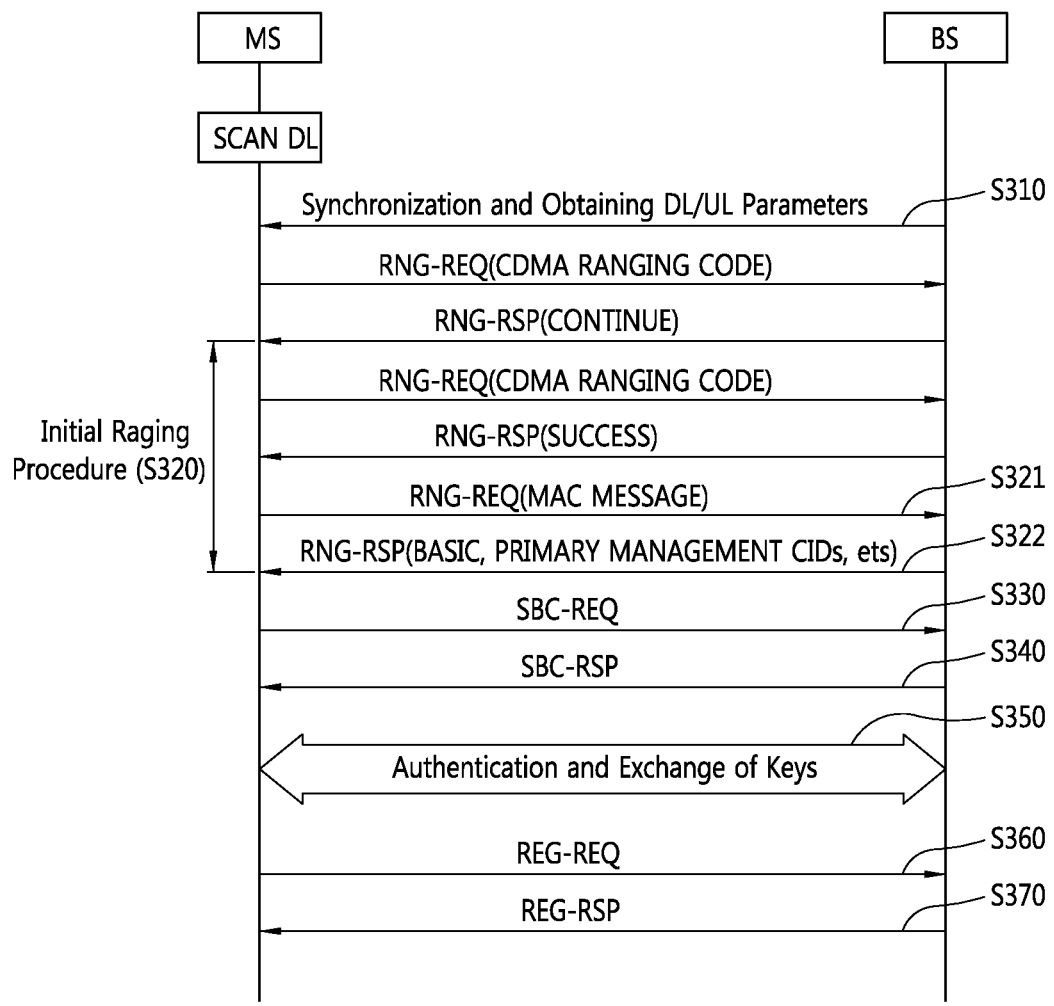
FIG. 3 is a flowchart illustrating an initial access method in a wireless communication system.

The memory 12, 22 may be placed inside or outside the control unit 11, 21 and connected to the control unit 11, 21 using a variety of well-known means, FIG. 3 is a flowchart illustrating an initial access method in a wireless communication system.

Referring to FIG. 3, when an MS 10 is powered on, it first searches for an accessible BS by scanning downlink channels in order to perform initial access. Here, the MS initially scans the frequencies of a surrounding BS one by one because it does not have information on a network geography or configuration.

Furthermore, the MS 10 obtains system information on downlink and uplink from a retrieved BS 20, finishes all system configurations (S310), and then performs a ranging procedure along with the retrieved BS as shown in FIG. 3. The MS selects a specific CDMA ranging code, and it is synchronized with uplink by performing the ranging procedure along with the BS using a contention-based method for transmitting the ranging code to the BS. (S320)

The BS informs the MS of parameter values to be corrected by the MS through a ranging response (RNGRSP) message until the synchronization is fully completed. While the parameter values are corrected, the RNGRSP message is set to a status "continue". After the parameter values are corrected, the BS sends the RNGRSP message having a status "success".

Here, the RNG-RSP message transmitted from the BS 20 to the MS 10 includes pieces of information on the power offset, timing offset, and data transmission/reception frequency offset of the MS which have been calculated by the BS based on a ranging request code received from the MS. The MS performs subsequent data transmission to the BS based on the pieces of information.

After the ranging request based on the ranging code is checked to have been successfully performed by the RNG-RSP message, the MS sends a ranging request (hereinafter referred to as a RNG-REQ) message to the BS (S321). The BS sends a corresponding RNG-RSP message to the MS (S322).

The MS that has received the RNG-RSP message from the BS sends a Subscriber station Basic Capability Request (hereinafter referred to as an SBC-REQ) message, including information on a variety of parameters and certification methods supportable by the MS, to the BS for the purpose of data transmission to/reception from the BS (S330).

The BS that has received the SBC-REQ message from the MS compares the parameters and certification methods, included in the SBC-REQ message and supported by the MS, with parameters and certification methods supported by the BS. As a result of the comparison, the BS determines parameters and a certification method that will be used by the MS for data transmission to/reception from the BS and sends a Subscriber station Basic Capability Response (hereinafter referred to as an SBC-RSP) message, including the parameters and certification method, to the MS (S340).

The MS completes the execution of the basic capability negotiations along with the BS and then performs an authentication procedure along with the BS. That is, the MS and the BS authenticate each other and exchange authorization keys (S350).

Next, the MS performs a BS registration procedure by exchanging a Registration Request (REG-REQ) message and a Registration Response (REG-RSP) message with the BS (S360, S370).

After the registration of the MS and the BS is performed, IP connectivity is set up, time of day is set up, and other operation parameters are transmitted. Thus, connection between the MS and the BS is set up.

Machine-to-Machine (M2M) Communication

M2M Communication is described in brief below.

Machine to Machine (M2M) communication as it is means communication between electronic devices. That is, it means communication between things. In general, M2M communication means wired or wireless communication between an electronic device and an electronic device or communication between a device which are controlled by a human being and a machine, but it is used to specially denote wireless communication between an electronic device and an electronic device, that is, devices. Furthermore, M2M devices used in a cellular network have lower performance or capability than common devices.

Furthermore, the features of an M2M environment are as follows.

1. A large number of MSs within a cell
2. A small amount of data
3. Low transmission frequency
4. A limited number of data characteristics
5. Not sensitive to time delay There are a lot of MSs within a cell, and the MSs may be distinguished from one another depending on the type, class, service type, etc. of the MS. In particular, when Machine to Machine (M2M) communication (or Machine Type Communication (MTC)) is taken into account, the total number of MSs may suddenly rise. M2M devices may have the following features depending on supported services.

1. They transmit data intermittently. Here, they may have periodicity.
2. They may have low mobility or they are fixed.
3. In general, they are not sensitive to latency in signal transmission.

A lot of M2M devices within a cell having the above features can transmit signals to or receive signals from a BS by using a multi-hop configuration or using a hierarchical structure.

That is, an M2M device can receive signals from a BS and send data to an M2M device that exists in another layer or a lower layer, or it can receive signals from other M2M devices and send signals to another M2M device or a BS. Or, M2M devices can directly perform communication with each other not a relay.

For the transmission of signals between M2M devices having this comprehensive meaning, the M2M devices may be connected in an upper/lower structure form to send signals. (In the case of direct communication between MSs, an upper/lower concept may not exist, but the upper/lower concept may also be applied likewise.)

For example, from a viewpoint of downlink transmission, an MS 1 receives a signal transmitted by a BS and sends the signal to an MS 2. Furthermore, the MS 1 may send the signal to another MS placed in a lower rank as well as the MS 2. Here, the MS 2 refers to an MS that is placed in a lower rank than the MS 1.

The MS 2 that has received the signal from the MS 1 sends the received signal to a lower MS, and the signal is transmitted to up to an MS N likewise. Here, a lot of MSs may be connected in a multi-hop form or hierarchically between the MS 2 and the MS N.

For another example, from a viewpoint of uplink transmission, for the transmission of signals between M2M devices, a signal may be transmitted as follows. An M2M device placed in a lower rank may send a signal to another M2M device or a BS using an M2M device placed in a higher rank.

Terms used in an M2M system are classified as follows.

(1) Machine-to-Machine (M2M) communication: refers to the exchange of pieces of information which may be performed without the participation of a human being between user devices through a BS or between a server and devices within core network through a BS.

(2) M2M ASN: refers to an access service network which can support M2M service.

(3) M2M device: refers to an MS which has an M2M function (or supports).

(4) M2M subscriber: refers to a consumer of M2M service.

(5) M2M server: refers to an entity which can communicate with an M2M device. An M2M server provides an interface that is accessible to an M2M subscriber.

(6) M2M feature: refer to a feature unique to an M2M application that is supported by an M2M ASN. One or more features may be necessary in order to support an application.

(7) M2M group: refers to a group of M2M devices which include common and/or the same M2M subscriber, that is, share one or more features.

A method for allocating Station Identifiers (STIDs) to M2M devices and methods for managing allocated STIDs and allocating resources to MSs using allocated STIDs in a wireless access system proposed in this specification are described below with reference to drawings.

Although an 802.16 (in particular, 16m) system is described as an example, it is evident that the methods proposed in this specification are not limited to the 802.16m system, but may be used in systems, such as LTE and LTE-A.

Definition of M2M Group ID (MGID) and M2M MS (or Device) ID (MDID)

In a system supporting M2M communication, a first identifier indicating an M2M group to which M2M devices belong is assigned to the M2M devices, and second identifiers for distinguishing the M2M devices belonging to the M2M group from one another are assigned to the respective M2M devices.

Here, the first identifier refers to an identifier used to distinguish M2M groups from one another within a cell, and the second identifier refers to an identifier used to distinguish M2M devices from one another in a group to which the M2M devices belong. That is, the first identifier may be represented by an M2M group ID, and the second identifier may be represented by an M2M device ID.

Furthermore, the first identifier may be used as a primary M2M device ID, and the second identifier may be used as a secondary M2M device ID.

Hereinafter, the first identifier is used as an M2M group ID, and the second identifier is used as an M2M device ID, for convenience of description.

That is, an M2M communication support system allocates an M2M group ID and an M2M device ID that will be used in communication with a BS to M2M devices when the M2M devices perform an initial network entry. Here, the M2M communication support system refers to a network entity that is connected to a BS or a network, and the network entity may be, for example, an M2M server.

Figure 4:
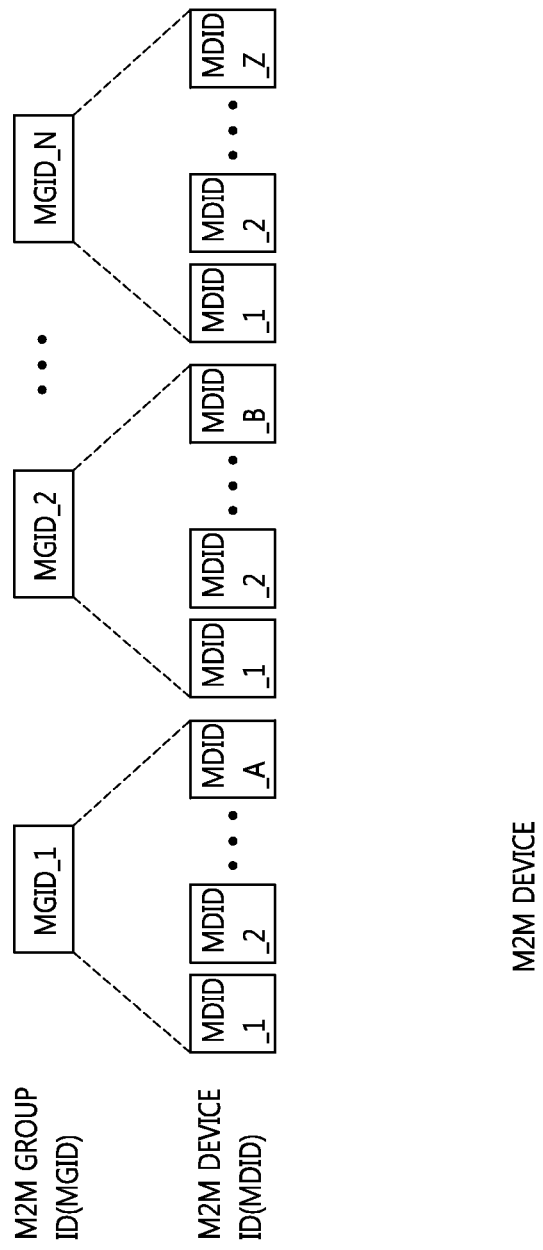
FIG. 4 is an example showing a relationship between M2M group IDs and M2M device IDs allocated to M2M devices in accordance with an embodiment of this specification.

FIG. 4 is an example showing a relationship between M2M group IDs and M2M device IDs allocated to M2M devices in accordance with an embodiment of this specification.

Referring to FIG. 4, it can be seen that M2M group IDs (MGIDs) are assigned from 1 to N. The M2M device IDs (MDIDs) of respective M2M devices that belong to a group are included in each of M2M groups. That is, as shown in FIG. 4, it can be seen that A MDIDs of MDIDs 1~A are allocated to the MGID 1, . . . , Z MDIDs of MDIDs 1~Z are allocated to the MGID N. Here, M2M devices belonging to different M2M groups may have the same ID.

A method for allocating an M2M group ID and an M2M device ID to an M2M device is described in detail below.

Figure 5:
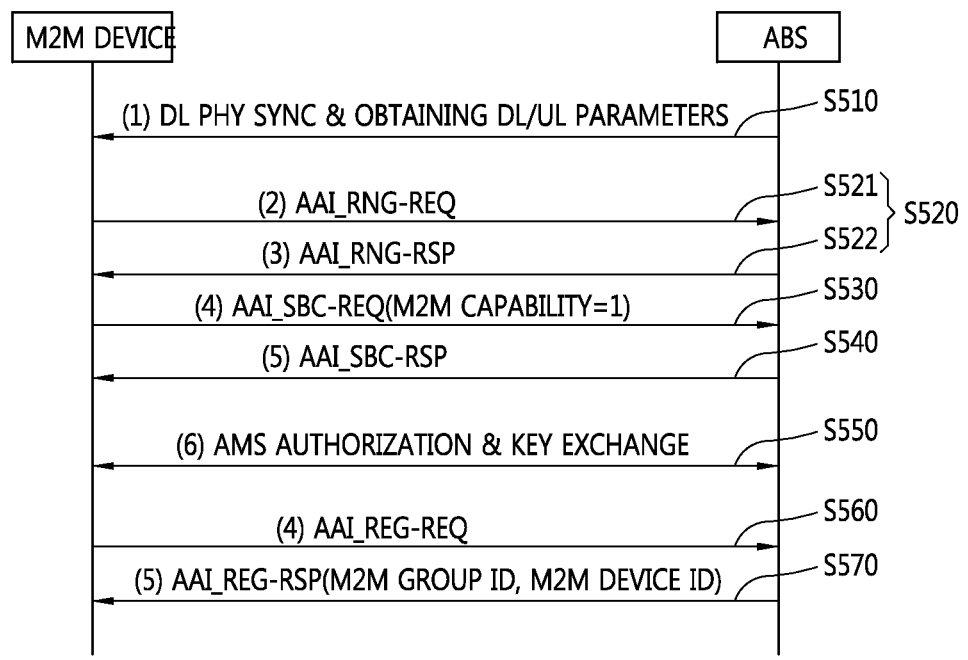
FIG. 5 shows that an M2M group ID and an M2M device ID are allocated to an M2M device through an initial network entry process in accordance with an embodiment of this specification.

FIG. 5 shows that an M2M group ID and an M2M device ID are allocated to an M2M device through an initial network entry process in accordance with an embodiment of this specification.

Steps S510~S520 (S521, S522) and S540~S560 are the same as the steps S310~S320 (S321, S322) and S340~S360, and thus a description of the same parts is omitted and only a difference is described.

Referring to FIG. 5, during a basic capability negotiation process between an MS and a BS on an initial network entry, the MS sends an SBC-REQ message, including information informing that the MS is an M2M device or an MS having a capability to support M2M communication, to the BS (S530).

For example, the MS sets an M2M capability field within the SBC-REQ message to '1' and sends the SBC-REQ message to the BS.

The BS that has received the SBC-REQ message in which the M2M capability field is set to '1' (indicating the MS is an M2M device) from the MS knows that the MS is an M2M device and allocates an M2M group ID and an M2M device ID to the MS.

Here, the BS includes the M2M group ID and an M2M device ID allocated to each of the MSs of a corresponding group in an RNGRSP message (AAI_REG-RSP) and allocates an identifier (ID) for M2M communication support to the MS (S570).

That is, as shown in FIG. 5, it can be seen that the BS knows that the MS is an M2M device because the M2M capability field has been set to '1' (M2M device) through the M2M capability field included in the basic capability negotiation request (AAI_SBC-REQ) message received from the corresponding MS and allocates the M2M group ID and the M2M device ID to the corresponding MS through the REG-RSP message.

Figure 6:
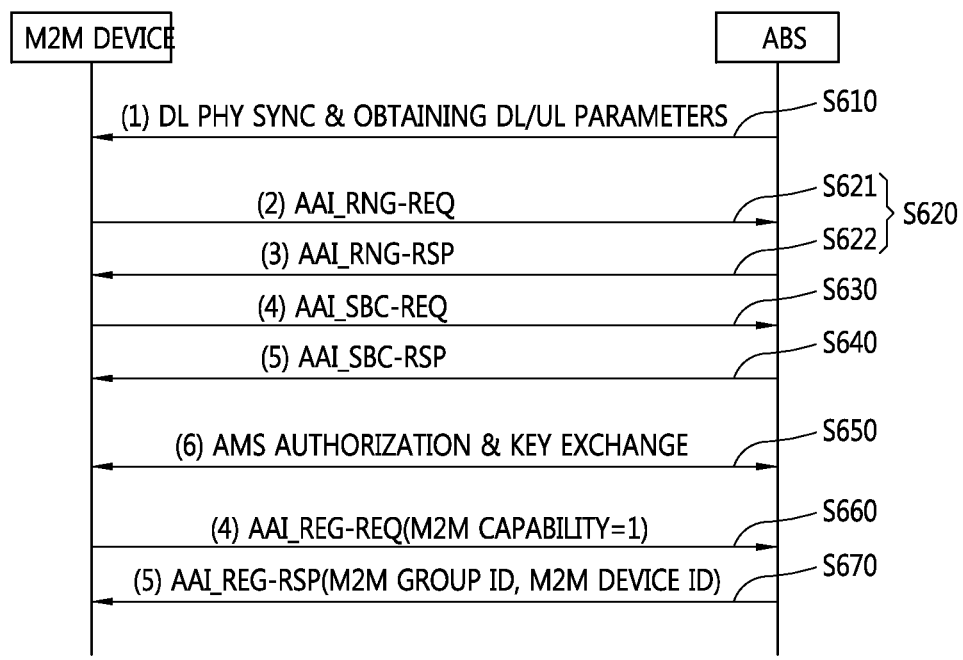
FIG. 6 shows that an M2M group ID and an M2M device ID are allocated to an M2M device through an initial network entry process in accordance with yet another embodiment of this specification.

FIG. 6 shows that an M2M group ID and an M2M device ID are allocated to an M2M device through an initial network entry process in accordance with yet another embodiment of this specification.

FIG. 6 is the same as FIG. 5 except a step S660, and thus a description of the same parts is omitted and only a difference is described.

In FIG. 6, an MS informs a BS that it is an M2M device or an MS having a capability to support M2M communication through a registration procedure between the MS and the BS on an initial network entry.

That is, the MS sends an REG-REQ message, including information (e.g., an M2M capability field) indicating that the MS is an M2M device or an MS having a capability to support M2M, to the BS (S660).

The BS that has received the REG-REQ message in which the M2M capability field has been set to '1' (indicating that the MS is an M2M device) from the MS knows that the MS is an M2M device and allocates an M2M group ID and an M2M device ID to the MS. In this case, the BS may allocate the M2M group ID and the M2M device ID to the MS only at need.

Figure 7:
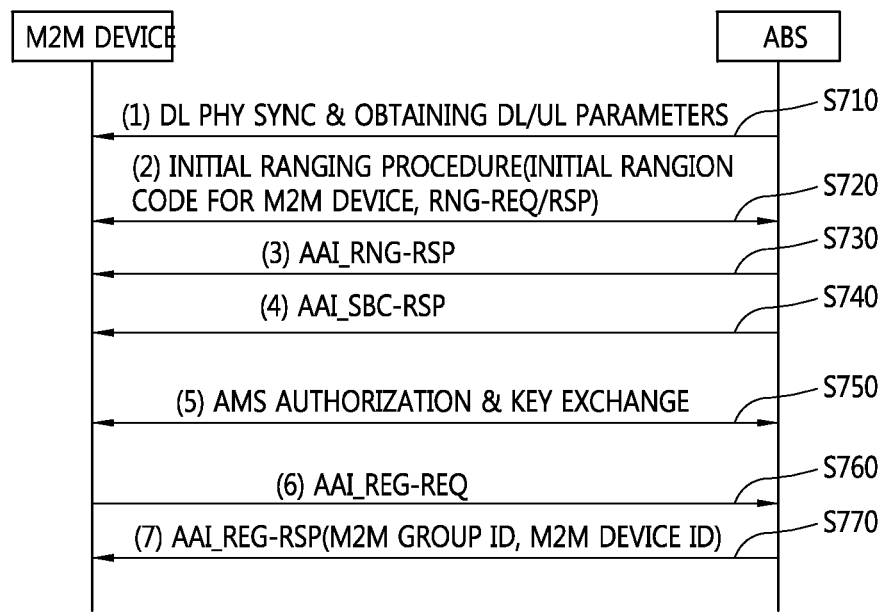
FIG. 7 shows that an M2M group ID and an M2M device ID are allocated to an M2M device through an initial network entry process in accordance with further yet another embodiment of this specification.

FIG. 7 shows that an M2M group ID and an M2M device ID are allocated to an M2M device through an initial network entry process in accordance with further yet another embodiment of this specification.

Procedures of FIG. 7 are the same as those of FIG. 5 except an initial ranging procedure part (S720), and thus a description of the same parts is omitted and only a difference is described.

Referring to FIG. 7, a BS may allocate an initial ranging code partition information set, used by M2M devices, to the M2M devices separately.

The BS may send the initial ranging code partition information to the M2M devices through a Secondary Super Frame Header (S-SFH). Here, the S-SFH may be the existing S-SFH or may be a new S-SFH.

The M2M devices that have received the S-SFH from the BS send an initial ranging code for M2M to the BS at the time of initial ranging (S720).

When the BS receives the initial ranging code for M2M from the MS, the BS can know that the corresponding MS is an M2M device and sends an REG-RSP message, including an M2M group ID and an M2M device ID, to the MS (S770).

Figure 8:
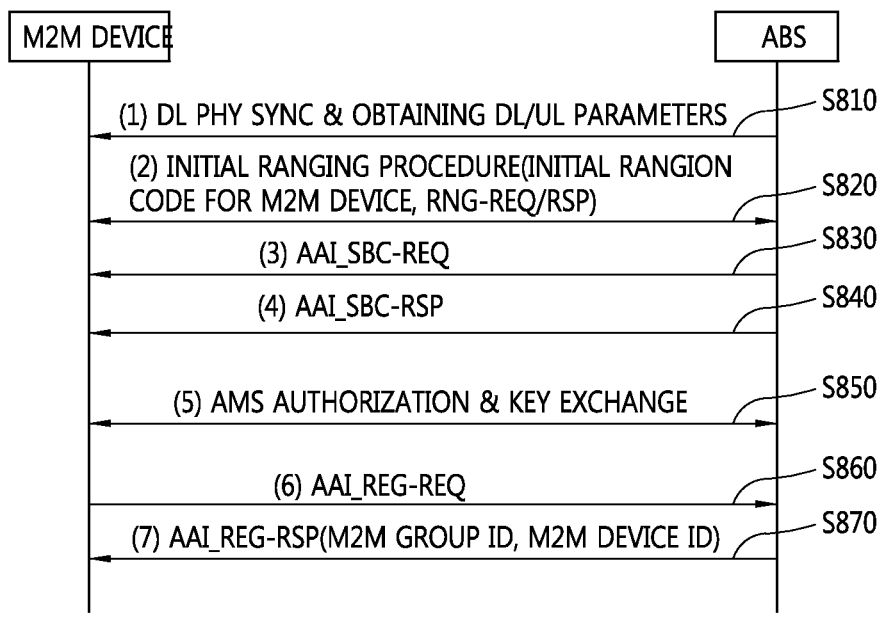
FIG. 8 shows that an M2M group ID and an M2M device ID are allocated to an M2M device through an initial network entry process in accordance with still yet another embodiment of this specification.

FIG. 8 shows that an M2M group ID and an M2M device ID are allocated to an M2M device through an initial network entry process in accordance with still yet another embodiment of this specification.

Procedures of FIG. 8 are the same as those of FIG. 5 except an initial ranging procedure part (S820), and thus a description of the same parts is omitted and only a difference is described.

Referring to FIG. 8, for time-sensitive M2M devices (i.e., MSs having an enhanced access priority), a BS allocates a dedicated ranging code or a dedicated ranging region to the MS.

Here, the BS may allocate a limited shared ranging code or shared ranging resources to time-tolerant M2M devices as in the existing ranging code.

If the dedicated ranging code is received from an MS or a ranging code is received from the dedicated ranging region (S820), the BS determines that the MS is an MS having high priority.

The BS may allocate a region different from that of a ranging channel through which common MSs perform transmission to a ranging channel used by M2M devices.

Accordingly, when a BS receives a ranging code through a ranging channel for an M2M device from an MS, the BS determines that the MS that has sent the ranging code is an M2M device.

That is, if it is determined that an M2M group ID and an M2M device ID need to be allocated to the MS, the BS sends an REG-RSP message, including the M2M group ID and the M2M device ID, to the MS (S870).

Method for Allocating and Masking M2M Group ID

A method for allocating and masking an M2M group ID proposed in this specification is described in detail below.

First, Cyclic Redundancy Check Mask is described in short below.

CRC of 16 bits is generated based on randomized content of an allocation A-MAP IE and is masked by 16-bit CRC masking that uses a bitwise-XOR operation. Here, the 16-bit masked CRC includes a masking prefix of 1 bit, a message type indicator of 3 bits, and a masking code of 12 bits.

First Method

The first method is a method for allocating the masking code of 12 bits to an M2M group ID when the masking prefix is '0x0' and the message type indicator is '001', and it proposes the following two types 1 and 2.

1. (1) an STID after a $65^{th}$ masking code value 65 of 12 bits is allocated as an M2M group ID As shown in Table 1 below, when a message type indicator is set to '001', STIDs corresponding to Nos. 0 to 64 are allocated for a broadcast assignment A-MAP IE, a BR-ACK A-MAP IE, and a GRA A-MAP IE.

That is, the STID Nos. 0~64 are used for common MSs used in human-to-human communication.

Accordingly, since IDs from a $66^{th}$ (i.e., an STID No. 65) to a No. $212^{th}$ (i.e., an STID No. 211) are not used, the STIDs corresponding to $66^{th}$~$212^{th}$ are allocated to MSs as an M2M group ID as in Table 1 below.

Table 1 below is an example showing masking codes when a message type indicator is '001' in accordance with an embodiment of this specification.

TABLE 1

| Decimal Value | Description |
|---|---|
| 0 | Used to mask Broadcast Assignment A-MAP IE for broadcast or ranging channel assignment |
| 1 | Used to mask BR-ACK A-MAP IE |
| 2-64 | Used to mask Group Resource Allocation A-MAP IE (group ID) |
| 65-A | M2M group ID |
| A-4095 | Reserved |

Referring to Table 1, when a masking prefix is '0b0' and a type indicator is '001', if the remaining 12-bit masking code value has a value of a specific range (indicated by 'A' in Table 1) from 65, an MS determines corresponding STIDs as an M2M group ID.

(2) To allocate STIDs after a 12-bit masking code value 129 as M2M group IDs. As shown in Table 2 below, when a message type indicator is set to '001', STIDs corresponding to Nos. 0 to 128 are allocated for a Broadcast assignment A-MAP IE, a BR-ACK A-MAP IE, and a GRA A-MAP IE.

That is, the STID Nos. 0~128 are used for common MSs used in human-to-human communication.

Accordingly, since IDs from a $130^{th}$ (i.e., an STID No. 129) to a $4096^{th}$ (i.e., an STID No. 4095) are not used, STIDs corresponding to $130^{th}$~$4096^{th}$ are allocated to MSs as an M2M group ID as in Table 2 below.

TABLE 2

| Decimal Value | Description |
|---|---|
| 0 | Used to mask Broadcast Assignment A-MAP IE for broadcast or ranging channel assignment |
| 1 | Used to mask BR-ACK A-MAP IE |
| 2-128 | Used to mask Group Resource Allocation A-MAP IE (group ID) |
| 129-4095 | M2M group ID |

2. (1) Some region of the 12-bit masking code values 65~4095 are allocated as an M2M group ID.

As an example of the 2. (1) method, M2M group IDs may be allocated as below.

1) An M2M group ID 1: 65~a (65+N) (includes a total of N M2M device IDs)

2) An M2M group ID 2: a~b (a+N) (includes a total of N M2M device IDs)

....

3) An M2M group ID Y: y~z (y+N) (includes a total of N M2M device IDs)

In the 2.(1), if N=32, M2M group IDs are allocated as below.

1) An M2M group ID 1: 65~97 (a total of 32)

2) An M2M group ID 2: 97~129 (a total of 32)

....

3) An M2M group ID Y: Y~Y+32 (a total of 32)

(2) Some region of the 12-bit masking code values 129~4095 are allocated as M2M group IDs.

As an example of the 2.(2) method, M2M group IDs may be allocated as below.

1) An M2M group ID 1: 129~a (129+N) (includes a total of N M2M device IDs)

2) An M2M group ID 2: a~b (a+N) (includes a total of N M2M device IDs)

. . . .

3) An M2M group ID Y: y~z (y+N) (includes a total of N M2M device IDs)

In the 2.(2), if N=32, M2M group IDs are allocated as below.

1) An M2M group ID 1: 129~161 (a total of 32)

2) An M2M group ID 2: 161~193 (a total of 32)

. . . .

3) An M2M group ID Y: Y~Y+32 (a total of 32)

Here, an value N, that is, a value indicating the number of M2M devices included in each M2M group, can be transmitted to the M2M devices through a system information transfer signal or message.

The system information transfer signal or message may be a Super Frame Header (SFH), a System Configuration Descriptor (SCD) message, or an M2M configuration broadcast message.

Furthermore, information about how many groups are included in an M2M support system as well as the value N can also be transmitted to the M2M devices through the system information transfer signal or message.

Accordingly, an MS can know that an M2M group is constructed of what 12-bit IDs by receiving the value N and the information on the number of M2M groups through a system information transfer signal or message from a BS.

Here, a method for determining an M2M group ID may be modified as follows.

For example, the first (or the last) ID in each M2M group may be determined as the ID of a corresponding M2M group, and the remaining IDs may be determined as the IDs of M2M devices that belong to the M2M group.

Here, the length of the M2M device ID may be L bits, and the value L may be determined using Equation 1 below.

$$L = \lfloor \log_2(\text{total number of devices accommodable in group}) \rfloor$$

In Equation 1, $\lfloor \ \rfloor$ indicates a ceiling function. That is, it indicates the smallest natural number value from among natural numbers greater than a value within $\lfloor \ \rfloor$.

Second Method

The second method is a method for allocating an M2M group ID using unused type indicators when a masking prefix is '0x0', and it proposes the following two cases 1 and 2.

1. Allocate an M2M group ID using unused type indicators 011~111

That is, the method of 1 is to use any one of the type indicators 011~111 for an M2M group ID when the masking prefix is '0x0'.

For example, a BS may allocate the type indicator '011' for an M2M group ID. In this case, an MS can know that all the masking codes of 12 bits correspond to the M2M group ID when the masking prefix is '0x0' and the type indicator is '011'.

Table 3 below is an example showing the masking code of 12 bits when the masking prefix is '0x0' and the type indicator is '011' in accordance with an embodiment of this specification.

TABLE 3

| Masking Prefix | Remaining 15-bit LSBs | |
|---|---|---|
| (1-bit MSB) | Type Indicator | Masking Code |
| 0b0 | 0b000 | 12-bit STID or TSTID |
| | 0b001 | |
| | 0b010 | |
| | 0b011 | 12-bit MGID |
| | 0b100-0b111 | reserved |

Referring to Table 3, when a BS allocates an M2M group ID to an MS, the MS sets a masking prefix to '0x0' and a type indicator to '011' and performs a process of decoding an A-MAP IE using the M2M group ID allocated by the BS.

As another method, all 0b011~0b111 may be allocated as an MGID as in Table 4 below.

TABLE 4

| Masking Prefix | Remaining 15-bit LSBs | |
|---|---|---|
| (1-bit MSB) | type Indicator | Masking Code |
| 0b0 | 0b000 | 12-bit STID or TSID |
| | 0b001 | Refer to Table 2 or 3 |
| | 0b010 | |
| | 0b011~0b111 | M2M group ID (MGID) |

2. 12-bit masking codes in which type indicators are placed in regions having 0b010~0b111 are allocated as an M2M group ID Here, a method for allocating the M2M group ID is similar to 2 of the first method.

That is, like in 2 of the first method, information on how many M2M devices can be accommodated in an M2M group and information on how many groups are included in a system are transmitted to M2M devices through a system information transfer signal or message.

The M2M devices that have received the system information transfer signal or message, including information related to a group, from the BS can know information on the M2M group supported in a system.

Accordingly, the MS is assigned an M2M group ID from the BS through a registration process with the BS. The MS checks a type indicator value for the allocated M2M group ID and performs CRC masking when decoding an A-MAP IE using the type indicator and the allocated M2M group ID. The MS reads the A-MAP IE through this process.

That is, a BS allocates an M2M group ID to an MS by making a masking prefix to '0b0', any one value of type indicators 0b01~0b111 and an M2M group ID of 12 bits, that is, a total of 16 bits to CRC.

Here, the M2M device ID has a length of L bits, and the value L is determined through Equation 1.

A method for allocating unicast resources to only specific M2M devices when an event trigger condition for M2M devices belonging to an M2M group is satisfied or at a specific point of time is described below.

First, a BS may allocate unicast resources to specific M2M devices when an event trigger condition or a specific point of time is satisfied through, for example, a DL/UL M2M unicast allocation A-MAP IE.

In this case, the CRC of the M2M unicast allocation A-MAP IE is masked as an M2M group ID, and the M2M unicast allocation A-MAP IE includes M2M device IDs indicating MSs that belong to an M2M group.

Table 5 below shows an example of a DL/UL M2M unicast allocation A-MAP IE format in accordance with an embodiment of this specification.

TABLE 5

| Syntax | Description |
|---|---|
| DL/UL M2M unicast allocation A-MAP IE ( ) { | |
| Type | |
| M2M device ID | ID for M2M device |
| CRC | Mask with M2M group ID |
| } | |

The invention claimed is:

1. A method for machine-to-machine (M2M) communication in a wireless access system, the method comprising:
  receiving, by a M2M device from a base station, a M2M group identifier (MGID) being identification information related to a M2M group to which the M2M device belongs;
  applying, by the M2M device, the MGID to a cyclic redundancy check (CRC) mask; and
  decoding, by the M2M device, a message, which is in form of an advanced map information element (A-MAP IE) based on the CRC mask,
  wherein the CRC mask includes a masking prefix, a type indicator and a masking code.

2. The method of claim 1, wherein the masking code corresponds to the MGID.

3. The method of claim 1, a size of the MGID is 12 bits.

4. The method of claim 1, the MGID is transmitted, from the base station, through a registration response (REG-RSP) message.

5. A machine-to-machine (M2M) device in a wireless access system, the M2M device comprising:
  a radio frequency (RF) unit configured to transmit and receive a radio signal; and
  a control unit operatively connected to the RF unit and configured for:
    receiving, from a base station, a M2M group identifier (MGID) being identification information related to a M2M group to which the M2M device belongs;
    applying the MGID to a cyclic redundancy check (CRC) mask; and
    decoding a message, which is in form of an advanced map information element (A-MAP IE) based on the CRC mask,
    wherein the CRC mask includes a masking prefix, a type indicator and a masking code.

6. The M2M device of claim 5, wherein the masking code is corresponds to the MGID.

* * * * *